United States Patent
Sherman et al.

(10) Patent No.: US 11,352,553 B2
(45) Date of Patent: Jun. 7, 2022

(54) POLYMER COATED PROPPANT

(71) Applicant: Powdermet, Inc., Euclid, OH (US)

(72) Inventors: Andrew Sherman, Mentor, OH (US); Brian Werry, Euclid, OH (US)

(73) Assignee: POWDERMET, INC., Euclid, OH (US)

( * ) Notice: Subject to any disclaimer, the term of this patent is extended or adjusted under 35 U.S.C. 154(b) by 0 days.

(21) Appl. No.: 14/936,873

(22) Filed: Nov. 10, 2015

(65) Prior Publication Data
US 2016/0137911 A1   May 19, 2016

Related U.S. Application Data

(60) Provisional application No. 62/081,216, filed on Nov. 18, 2014.

(51) Int. Cl.
| | | |
|---|---|---|
| C09K 8/80 | (2006.01) | |
| E21B 43/267 | (2006.01) | |
| E21B 43/27 | (2006.01) | |

(52) U.S. Cl.
CPC .................................. C09K 8/805 (2013.01)

(58) Field of Classification Search
None
See application file for complete search history.

(56) References Cited

U.S. PATENT DOCUMENTS

| | | | |
|---|---|---|---|
| 4,336,842 A | | 6/1982 | Graham et al. |
| 4,373,039 A | | 8/1983 | Mueller et al. |
| 4,518,039 A | * | 5/1985 | Graham .......... C09K 8/805 166/276 |
| 4,920,192 A | | 4/1990 | Wiser-Halladay |
| 7,308,939 B2 | | 12/2007 | Welton et al. |
| 7,350,571 B2 | | 4/2008 | Nguyen et al. |
| 7,845,409 B2 | * | 12/2010 | Shinbach .......... C09K 8/80 166/280.2 |
| 8,133,587 B2 | | 3/2012 | Rediger et al. |
| 2002/0004464 A1 | * | 1/2002 | Nelson .......... C09K 8/92 507/200 |
| 2005/0239960 A1 | * | 10/2005 | Papenfuhs .......... C08F 8/28 525/61 |
| 2006/0177661 A1 | | 8/2006 | Smith et al. |
| 2007/0027245 A1 | | 1/2007 | Vaidya et al. |
| 2007/0181302 A1 | * | 8/2007 | Bicerano .......... C09K 8/68 166/280.2 |
| 2012/0279703 A1 | | 11/2012 | McDaniel et al. |
| 2013/0233545 A1 | * | 9/2013 | Mahoney .......... C09K 8/685 166/280.2 |
| 2015/0068747 A1 | * | 3/2015 | Hwang .......... C09K 8/80 166/280.2 |
| 2016/0075940 A1 | * | 3/2016 | Rappolt .......... C09K 8/805 166/280.2 |

OTHER PUBLICATIONS

U.S. Searching Authority, International Search Report and Written Opinion issued for corresponding PCT Application No. PCT/2015/059830 dated Feb. 2, 2016.

* cited by examiner

*Primary Examiner* — Charles R Nold
(74) *Attorney, Agent, or Firm* — Ulmer & Berne LLP; Brian E Turung

(57) ABSTRACT

A cross-linkable thermoplastic resin coating that is suitable for use in a coated proppant material used in sand control in oil and gas wells. The cross-linkable thermoplastic exhibits improved stability and low temperature and pressure strength compared to current thermosetting resin formulations.

6 Claims, 1 Drawing Sheet

POLYMER COATED PROPPANT

The present invention claims priority on U.S. Provisional Patent Application Ser. No. 62/081,216 filed Nov. 18, 2014, which is incorporated herein.

The present invention relates to compositions and methods of preparing polymer-coated particles for subterranean operations such as gravel packing, frac-packing, and hydraulic fracturing.

BACKGROUND OF THE INVENTION

In the production of subterranean wells for operations in recovery of oil, water, gas or injection wells, and similar deep-well boreholes, it is often necessary to stimulate the well formations. A popular and effective example of a well treatment involves the use of particulate materials in hydraulic fracturing. These particles act to prop open the instilled/induced fractures to maintain long-term conductivity; thus, the applied particles are termed "proppant." In addition, these particulate materials function as sand control techniques to prevent the influx of incursion of sediment fines.

Particulate materials composed of sand, ceramic or gravel have long been used in hydraulic fracturing treatments and gravel pack completions. However, it has been recognized that these materials alone exhibit deficiencies in the form of unwanted shifting or drifting, thereby resulting in loss of packing and, ultimately, loss in well productivity.

Recognizing this, particulate materials used in subterranean operations are often coated with a resinous or polymeric material to facilitate in the consolidation of the particulates so they remain in place, thus preventing fracture collapse or being flowed back into the wellbore. Several examples of such coated particles are disclosed in U.S. Pat. No. 4,336,842 "Method of treating wells using resin-coated particles"; U.S. Pat. No. 4,920,192 "Polyurethane quasi prepolymer for proppant consolidation"; U.S. Pat. No. 7,308,939 "Methods of using polymer-coated particulates"; and U.S. Pat. No. 7,350,571 "Methods of preparing and using coated particulates". These patents are incorporated herein by reference. Similarly, these patents describe coated particles with fusible thermosetting resin placement in wellbores followed by curing. The resins at subterranean formation temperatures fuse together such that, upon curing, the particles form an infused matrix. The consolidated product is strong and permits for long-term stability of conductance for formation fluids.

While thermoset curable resin-coated particles have proven successful as proppants in some cases, there is a problem with their application at lower temperatures. Some resins do not cure at temperatures below 130° F., or cure too slowly at temperatures below 200° F. As such, at low-temperature well operations, such as locations on or near the Gulf of Mexico, these thermoset curable resins are undesirable from an operational point of view since the slow or non-existent curing of the resin results in expensive and long down times. Furthermore, thermosetting resins that are currently used continue to cross-link over time, thus becoming brittle, thereby losing their tackiness and ability to capture fines, and to prevent flow degradation over time.

SUMMARY OF THE INVENTION

The present invention relates to thermoplastic-coated particles and to methods of preparing thermoplastic-coated particles for subterranean operations such as gravel packing, frac-packing, and hydraulic fracturing. The application of thermoplastic coatings on the particles is suited for low temperature wells, wherein thermoset curable resins perform poorly.

Particulate material that is to be coated which is suitable for use in the present invention can be any material deemed suitable for subterranean operations. Non-limiting examples of particulate material that can be used in the present invention include ceramic materials, glass materials, metal materials, polymer beads, bauxite, sand, recycled bio-organic lignin or cellulose (like nut shells), and the like. The particle size of the particulate material is generally at least 0.005 mm and typically less than about 20 mm (e.g., 0.005 mm, 0.0051 mm, 0.0052 mm . . . 19.9998 mm, 19.9999 mm, 20 mm and any value or range therebetween). In one non-limiting embodiment, the average particle size of the particulate material is 0.01-10 mm. In another non-limiting embodiment, the average particle size of the particulate material is 0.1-4 mm. In another non-limiting embodiment, the average particle size of the particulate material is 0.1-4 mm. In another non-limiting embodiment, the average particle size of the particulate material is 0.2-2 mm. In non-limiting particular arrangement, the average particle size of the particulate material is about 0.8-1.1 mm. The shape of the particulate material is non-limiting. As can be appreciated, certain sizes and shapes of the particulate material may be desired for certain applications.

Thermopolymers for use as a coating for the particulate material must meet certain criteria with regard to a combination of tensile strength, adhesive strength, and cross-linking density of thermopolymers. Thermoplastic polymers that can be used to partially or fully coat the particulate material are those that are capable of self-crosslinking functionality. These polymers include, but are not limited to, polyamines, polyvinyl acetals, polyvinyl butyrals, derivatives of a polyamine, and derivatives of polyvinyl acetal. Thermopolymer polyvinyl acetals are one non-limiting cross-linkable thermopolymer that can be used based on their high tensile strength relative to other thermopolymers, in addition to their relatively high cross-linking unit density per monomer unit molecular weight. However, other or additional polymers can be used.

Several factors determine the ultimate properties of the proppant. These properties include, but are not limited to, coating thickness, the area of contact by proppant, the polymer's tensile strength, and the polymer's adhesive strengths. Experimental and theoretical studies have been conducted to determine acceptable limits of coating thickness meeting minimum adhesion strength and with acceptable drop in proppant permeability. A coating thickness that was too thick resulted in the thermopolymer excessively lowering the permeability. A coating thickness that was too thin resulted in the proppant having inadequate strength to resist movement.

The polymer-coated particulate material of the present invention results in an immobile proppant with increased pack permeability, improved proppant pack stability that prevents encroachment of formation fines into the pack, migration of fines within the proppant pack, and sediment permeation.

In accordance with one non-limiting embodiment of the invention, there is provided a method for production of a polymer-coated proppant through a discreet polymer coating solution composition and application. The polymer coating on the particulate material constitutes at least a 2% increase in volume around the particulate material, and typically less than a 50% volume increase (e.g., 2%, 2.1%, 2.2% . . . 49.8%, 49.9%, 50% and any value or range therebetween).

In one non-limiting embodiment, the polymer coating on the particulate material constitutes a 5-20% (e.g., 5%, 5.01%, 5.02% . . . 19.98%, 19.99%, 20% and any value or range therebetween) uniform increase in volume around the particulate material. In another non-limiting embodiment, the polymer coating on the particulate material constitutes a 3-10% uniform increase in volume around the particulate material. In one specific non-limiting example, a 16/20 mesh-sized particulate material that can be used in applications for retained permeability with high strength after low temperature, low pressure curing has a polymer coating thickness of 25-50 um.

Generally, the polymer coating on the particulate material is highly uniform to obtain improved results in well treatments under low temperature and pressure; however, this is not required. In one non-limiting method, a uniform polymer coating is applied to the particulate material by dissolving the polymer and any additives (e.g., activator, and modifiers (such as plasticizers and strengthening fillers)) in a suitable solvent for spray application on the particulate material. Non-limiting examples of solvents include alcohols, water, acetone, toluene, xylenes, acetates, hexanes, and other hydrocarbon solvents. As can be appreciated, other coating processes can be used. Generally, the coating process includes the step of providing controlled agitation to the particulate material to inhibit or prevent agglomeration and matching of solvent spray versus evaporation rates. Non-limiting devices that can be used to coat the particulate material include a fluidized bed (wurster coating), a v-blender, a double cone blender, a plow mixer, a paddle mixer, and a ribbon mixer.

Additives and/or modifiers can optionally be added to the polymer coating to obtain improved properties over pure cross-linkable thermoplastic polymers (e.g., adhesion strength, etc.). These additives and modifiers can be used to control the mechanical properties and/or cure strength of the polymer coating. In one non-limiting embodiment, at least about 0.5 wt % polymer coating includes one or more additives and/or modifiers mixture and up to about 50 wt % of the polymer coating can include one or more additives and/or modifiers (e.g., 0.5 wt %, 0.51 wt %, 0.52 wt % . . . 49.98 wt %, 49.99 wt %, 50 wt % and any value or range therebetween). In one non-limiting formulation, about 5-30 wt % of the polymer coating thermosetting resin includes one or more additives and/or modifiers. In another non-limiting embodiment, at least 0.5 wt % plasticizer can optionally be included in the polymer coating and up to about 30 wt % plasticizer can be included in the polymer coating (e.g., 0.5 wt %, 0.51 wt %, 0.52 wt % . . . 29.98 wt %, 29.99 wt %, 30 wt % and any value or range therebetween). The plasticizer, when used, can be used to control deformation under loads to improve interparticle contact area. In one non-limiting formulation, about 3-10 wt % plasticizer can be included in the polymer coating. In another non-limiting embodiment, fillers and diluents can optionally be added to the polymer coating to provide higher tensile and/or tear strength for specific applications, and/or to improve high temperature stability for the low temperature curing system. Non-limiting fillers include, but are not limited to, thermoset resins and/or inorganic powders/fibers, nanoparticle fillers, and/or silane-coupled oxide nanoparticles and nanoplatelets. The fillers, when used, constitute 0-50% (e.g., 0%, 0.01%, 0.02% . . . 49.98%, 49.99%, 50% and any value or range therebetween) by weight of the polymer coating. In accordance with another non-limiting embodiment of the invention, the polymer coating optionally includes one or more chemical additives for special in situ properties/activities. Such chemical additives include, but are not limited, to antimicrobial metals, radiolabeled chemical tracers and/or kinetic expandable fillers.

The curing temperature and/or Tg of the polymer coating can be controlled through the use of modifier additions, and/or by controlling the percentage of specific active side-groups and the molecular weight of the curable thermoplastic resin systems used in the preparation of the curable thermoplastic-coated particulate material.

In accordance with another non-limiting embodiment of the invention, the polymer coating can optionally include one or more cross-linker compounds. Such cross-linker compounds include, but are not limited to, dialdehyde and trialdehydes. The cross-linker compounds can be used to allow for control over particle adhesion strength and/or chemical/water resistances. When a cross-linker is used, the cross-linker is generally added in an amount of at least 0.05 wt % of the coating mixture, and typically no more than about 10 wt % of the coating mixture (e.g., 0.05 wt %, 0.051 wt %, 0.052 wt % . . . 9.998 wt %, 9.999 wt %, 10 wt % and any value or range therebetween). In one non-limiting embodiment, the cross-linker is generally added in an amount of 0.1%-2 wt % of the coating mixture. In another non-limiting embodiment, the cross-linker is generally added in an amount of 0.5%-2 wt % of the coating mixture.

In one non-limiting formulation, the coating solution that is applied to the particulate material contains a mixture of 1-20% (e.g., 1%, 1.01%, 10.02% . . . 19.98%, 19.99%, 20% and any value or range therebetween) thermoplastic polymer and 0-2% (e.g., 0%, 0.01%, 0.02% . . . 1.98%, 1.99%, 2% and any value or range therebetween) cross-linker compound, optionally one or more additives and/or modifiers, and the balance solvent. Application of the coating solution can be performed using air or airless spray coating, and particle dispersion performed by means of fluidization, tumbling and machined mixing.

In application, the well treating method using the thermoplastic-coated proppant of the present invention includes (1) placement of the thermoplastic polymer-coated particles at the desired location in the well, and (2) initiation of self-annealing of the coated particles by deep-well conditions that have closure pressures at low as about 1,000 psig, and temperatures at low as about 30° C. The thermoplastic polymer-coated particles have improved performance as compared to commercially available proppants at temperatures up to 130° C. (e.g., 40-130° C. [40° C., 40.01° C., 40.02° C. . . . 129.98° C., 129.99° C., 130° C. and any value or range therebetween]) and pressures up to 12,000 psig (2000-12000 psig [2000 psig, 2000.1 psig, 2000.2 psig . . . 11999.8 psig, 11999.9 psig, 12000 psig and any value or range therebetween]). As can be appreciated, the thermoplastic polymer-coated particles of the present invention can be used at higher temperatures and/or pressures.

In another non-limiting aspect of the present invention, there is provided a coated proppant, wherein a particulate material is coated with a thermoplastic polymer that includes one or more cross-linkable functional groups. The particulate material generally includes one or more substances selected from the group consisting of sand, sintered bauxite, silica alumina, glass bead, bauxite, fumed silica, ceramic material, glass material, polymer material, polytetrafluoroethylene material, composite particulate, coated particulate, degradable particulate, and gravel, and any derivative thereof. The particulate material has a particle size of about 5-150 mesh, and typically 10-60 mesh, based on U.S. Standard Sieve Sizes. The one or more cross-linkable functional groups in the thermoplastic polymer coating includes one or more groups selected from hydroxyl, acetals, hemiacetals, esters, lactones, lactams, amides, imides, and acetates. The thermoplastic polymer coating generally includes one or more compounds selected from the group of polymers consisting of functional groups of polyvinyl butyrals, nylons, polyacetals, polyesters, polyamides, and polyimides. The one or more cross-linker additives optionally included in the thermoplastic polymer coating includes a dialdehyde and/or trialdehyde. The one or more cross-linker additive constitute about 0.5-2% of the coating weight of the thermoplastic polymer coating. The particulate material is a coated with a thermoplastic polymer coating having a coating thickness of about 1-150 microns. The thermoplastic polymer coating generally constitutes 3-10% of the total radius of the particle radius coated proppant. The thermoplastic polymer coating can constitute an increase of about 3-70% of the core particulate material. The thermoplastic polymer coating generally includes a catalyst and/or other additives to enhance the thermal and/or acid cross-linking of the cross-linkable thermoplastic polymer. The thermoplastic polymer coating can optionally be hydrated up to 50% of its dry weight prior to be coated onto the particulate material. The thermoplastic polymer coating does not tackify at temperatures below 30-60° C., and typically not below 50-60° C. The thermoplastic polymer coating cures in the temperature range of 30-140° C., and typically in the range of 60-80° C. The thermoplastic polymer coating cures over the span of 24-200 hours at temperatures of 30-150° C., and typically 24-96 hours at 60-80° C. The thermoplastic polymer coating is capable of re-curing, "self-healing" in the temperature range of 30-140° C., and typically 60-90° C. In another non-limiting aspect of the invention, the thermoplastic coating is applied in either a dry state or solvated by an appropriate solvent system. The at least one solvent selected from the group consisting of ethanol, acetone, water, isopropyl alcohol, toluene, methanol, diacetone alcohol, n-butyl alcohol, and xylene. The thermoplastic polymer constitutes 1 wt %-20 wt % of the total coating prior to be coated in the particulate material. Prior to the addition of the solvent, the thermoplastic polymer constitutes at least 50 wt % of the thermoplastic coating and no more than about 99.8 wt. % of the thermoplastic coating. In one non-limiting embodiment, prior to the addition of the solvent, the thermoplastic polymer constitutes 70-99.7 wt % of the thermoplastic coating. In another non-limiting embodiment, prior to the addition of the solvent, the thermoplastic polymer constitutes 85-99.5 wt % of the thermoplastic coating. In another non-limiting embodiment, prior to the addition of the solvent, the thermoplastic polymer constitutes 90-99.4 wt % of the thermoplastic coating. In another non-limiting embodiment, prior to the addition of the solvent, the thermoplastic polymer constitutes 95-99.2 wt % of the thermoplastic coating.

In another non-limiting aspect of the present invention, there is provided a method of treating a subterranean formation with a coated proppant comprising the steps of a) introduction of a fluid suspension of free-flowing coated proppants to the subterranean formation; b) delivering/packing the coated proppants into the subterranean formation; c) subjecting the coated proppants to temperatures within their curing range; and, d) maintaining well conditions to promote agglomeration of the thermoplastic-coated proppant to form an in situ immobile framework of proppant particles. The coated proppant immobile framework is formulated to reduce solid particle flow-back from the subterranean formation. The coated proppant immobile framework is formulated to reduce formation of fines from the subterranean formation and immobile framework.

One non-limiting object of the present inventions is the provision of a thermoplastic-coated particle and a method of using thermoplastic-coated particles for subterranean operations such as gravel packing, frac-packing, and hydraulic fracturing.

Another non-limiting object of the present inventions is the provision of thermoplastic coatings on the particles which are suited for low temperature wells.

Another non-limiting object of the present inventions is the provision of thermoplastic-coated particles that can be used as a proppant.

Another non-limiting object of the present inventions is the provision of thermoplastic-coated particles that are formed from particulate material such as, but not limited to, ceramic materials, glass materials, metal materials, polymer beads, bauxite, sand, recycled bio-organic lignin or cellulose (like nut shells), and the like.

Another non-limiting object of the present inventions is the provision of thermoplastic-coated particles that are formed from particulate material that are formed from particulate materials having a particle size of at least 0.005 mm and typically less than about 20 mm.

Another non-limiting object of the present inventions is the provision of thermoplastic-coated particles are formed of particulate material that is coated with thermopolymers that meet certain criteria with regard to a combination of tensile strength, adhesive strength, and cross-linking density of thermopolymers.

Another non-limiting object of the present inventions is the provision of thermoplastic-coated particles formed of particulate material that is coated with thermopolymers that are capable of self-crosslinking functionality.

Another non-limiting object of the present inventions is the provision of thermoplastic-coated particles formed of particulate material that is coated with thermopolymers that include, but are not limited to, polyamines, a polyvinyl acetals, polyvinyl butyrals, derivatives of a polyamine, and derivatives of polyvinyl acetal.

Another non-limiting object of the present inventions is the provision of thermoplastic-coated particles that results in an immobile proppant with increased pack permeability, improved proppant pack stability that prevents encroachment of formation fines into the pack, migration of fines within the proppant pack, and/or improved sediment permeation.

Another non-limiting object of the present inventions is the provision of thermoplastic-coated particles wherein the particulate material is coated using a discreet polymer coating solution composition.

Another non-limiting object of the present inventions is the provision of thermoplastic-coated particles wherein the polymer coating on the particulate material constitutes at least a 2% increase in volume around the particulate material, and typically less than a 50% volume increase.

Another non-limiting object of the present inventions is the provision of thermoplastic-coated particles wherein the polymer coating is uniformly coated on the particulate material.

Another non-limiting object of the present inventions is the provision of thermoplastic-coated particles wherein the size of the particulate material is 16/20 mesh and the polymer coating has a thickness of 25-50 um.

Another non-limiting object of the present inventions is the provision of thermoplastic-coated particles wherein the particulate material is coated with a uniform polymer coating by dissolving the polymer and any additives (e.g., activator, and modifiers (such as plasticizers and strengthening fillers)) in a suitable solvent for spray application on the particulate material; however, other coating processes can be used.

Another non-limiting object of the present inventions is the provision of thermoplastic-coated particles wherein the particulate material is coated with a uniform polymer coating by controlled agitation to the particulate material to inhibit or prevent agglomeration and matching of solvent spray versus evaporation rates.

Another non-limiting object of the present inventions is the provision of thermoplastic-coated particles wherein the particulate material is coated with a polymer coating that includes one or more additives and/or modifiers to obtain improved properties over pure cross-linkable thermoplastic polymers (e.g., adhesion strength, etc.).

Another non-limiting object of the present inventions is the provision of thermoplastic-coated particles wherein the particulate material is coated with a polymer coating that includes one or more additives and/or modifiers to control the mechanical properties and/or cure strength of the polymer coating.

Another non-limiting object of the present inventions is the provision of thermoplastic-coated particles wherein the particulate material is coated with a polymer coating that includes one or more additives and/or modifiers in the amount of at least about 0.5 wt % polymer coating and up to about 50 wt % of the polymer coating.

Another non-limiting object of the present inventions is the provision of thermoplastic-coated particles wherein the particulate material is coated with a polymer coating that includes one or more additives and/or modifiers in the form of one or more plasticizers in an amount of at least 0.5 wt % plasticizer and up to about 30 wt % plasticizer.

Another non-limiting object of the present inventions is the provision of thermoplastic-coated particles wherein the particulate material is coated with a polymer coating that includes one or more additives and/or modifiers in the form of one or more fillers and/or diluents to provide higher tensile and/or tear strength for specific applications, and/or to improve high temperature stability for the low temperature curing system. Non-limiting fillers include, but are not limited to, thermoset resins and/or inorganic powders/fibers, nanoparticle fillers, and/or silane-coupled oxide nanoparticles and nanoplatelets. The filler additional, when used, constitute 0-50% by weight of the polymer coating.

Another non-limiting object of the present inventions is the provision of thermoplastic-coated particles wherein the particulate material is coated with a polymer coating that includes one or more additives and/or modifiers in the form of one or more chemical additives. Such chemical additives include, but not limited, to antimicrobial metals, radiolabeled chemical tracers and/or kinetic expandable fillers.

Another non-limiting object of the present inventions is the provision of thermoplastic-coated particles wherein the particulate material is coated with a polymer coating that includes one or more additives and/or modifiers in the form of one or more cross-linker compounds for control over particle adhesion strength and/or chemical/water resistances. Such cross-linker compounds include, but are not limited to, dialdehyde and trialdehydes. When a cross-linker is used, the cross-linker is generally added in an amount of at least 0.05 wt % of the coating mixture, and typically less than about 10 wt % of the coating mixture.

Another non-limiting object of the present inventions is the provision of thermoplastic-coated particles wherein the particulate material is coated with a polymer coating that includes 1-20% thermoplastic polymer and 0-2% cross-linker compound, optionally one or more additives and/or modifiers, and the balance solvent.

Another non-limiting object of the present inventions is the provision of a well treating method using the thermoplastic-coated proppant that includes (1) placement of the thermoplastic polymer-coated particles at the desired location in the well, and (2) initiation of self-annealing of the coated particles by deep-well conditions that have closure pressures at low as about 1,000 psig, and temperatures at low as about 30° C.

Another non-limiting object of the present inventions is the provision of thermoplastic-coated particles having improved performance as compared to commercially available proppants at temperatures from 40-130° C. and pressures from 2000 psig to 12,000.

Another non-limiting object of the present inventions is the provision of thermoplastic-coated particles having a particle size of about 5-150 mesh.

Another non-limiting object of the present inventions is the provision of thermoplastic-coated particles wherein the particulate material is a coated with a thermoplastic polymer coating having a coating thickness of about 1-150 microns and the thermoplastic polymer coating generally constitutes 3-10% of the total radius of the particle radius coated particulate material, and the coating constitutes an increase of about 3-70% of the core particulate material.

Another non-limiting object of the present inventions is the provision of thermoplastic-coated particles wherein the polymer coating includes a catalyst and/or other additives to enhance the thermal and/or acid cross-linking of the cross-linkable thermoplastic polymer.

Another non-limiting object of the present inventions is the provision of thermoplastic-coated particles wherein the thermoplastic polymer coating does not tackify at temperatures below 30-60° C.

Another non-limiting object of the present inventions is the provision of thermoplastic-coated particles wherein the thermoplastic polymer coating cures in the temperature range of 30-140° C.

Another non-limiting object of the present inventions is the provision of thermoplastic-coated particles wherein the thermoplastic polymer coating cures over the span of 24-200 hours at temperatures of 30-150° C.

Another non-limiting object of the present inventions is the provision of thermoplastic-coated particles wherein the thermoplastic polymer coating is capable of re-curing, "self-healing" in the temperature range of 30-140° C.

Another non-limiting object of the present inventions is the provision of thermoplastic-coated particles wherein the thermoplastic polymer constitutes 1-20 wt % of the total coating prior to be coated in the particulate material.

Another non-limiting object of the present inventions is the provision of a method of treating a subterranean formation with a coated proppant comprising the steps of a) introduction of a fluid suspension of free-flowing coated proppants to the subterranean formation; b) delivering/packing the coated proppants into the subterranean formation; c) subjecting the coated proppants to temperatures within their curing range; and, d) maintaining well conditions to promote agglomeration of the thermoplastic-coated proppant forming an in situ forming immobile framework of proppant particles.

Other objects, advantages, and novel features of the present invention will become apparent from the following detailed description of the invention when considered in conjunction with the accompanying drawings.

BRIEF DESCRIPTION OF THE DRAWINGS

Referring particularly to the drawings for the purposes of illustration only and not limitation.

DETAILED DESCRIPTION OF NON-LIMITING EMBODIMENTS

Referring now to the figures wherein the showings illustrate non-limiting embodiments of the present invention, the present invention is directed to compositions and methods for preparing modified thermoplastic-coated particulates, and the use of coated particulates in subterranean applications involving enhanced oil recovery and sand control. By coating the particulates with a thermoplastic resin system that has the controlled ability to cure and/or cross-link, and which has active side groups within certain ranges, the thermoplastic-coated particles possess a "self-healing" quality in the well upon any shifting or damage to the well pack. The compositions of the present invention are hydrolytically and thermally stable in that the compositions have a set number of active terminations that can cross-link, and which number remains stable over time. Furthermore, these active terminations "cure" or cross-link over a much wider temperature range than conventional thermoplastics, thus being able to form structure bonding at temperatures below 100° C., and typically at temperatures as low as 30-60° C. (e.g., 30° C., 30.01° C., 30.02° C. . . . 5.98° C., 5.99° C., 50° C. and any value or range therebetween) in subterranean formations. These curable thermoplastic-coated particulates (e.g., proppant) formulations also can form structural functions under low or no clamping forces. As such, the thermoplastic-coated particulate formulations do not need the application of compressive forces to form strong interparticle bonding. These characteristics are unique from procured and curable resins based on phenolics, epoxies, and other systems in current use and application in the industry.

Particulate material suitable for use in the present invention can be comprised of any material deemed suitable for subterranean operations. Non-limiting examples of particulate material include ceramic materials, glass materials, metal materials, polymer beads, bauxite, sand, recycled bio-organic lignin or cellulose (like nut shells), and the like. The particle size of the particulate material is generally at least 0.005 mm and typically less than about 20 mm. In one non-limiting embodiment, the average particle size of the particulate material is 0.01-10 mm.

The thermoplastic polymers that can be used to partially or fully coat the particulate material are those that are capable of self-crosslinking functionality. These polymers include, but are not limited to, polyamines, polyvinyl acetals, polyvinyl butyrals, derivatives of a polyamine, and derivatives of polyvinyl acetal.

Figure 1:
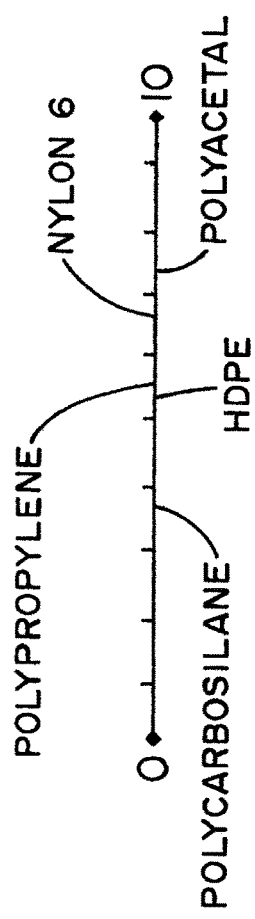
FIG. 1 is a graphic representation of relative ratings of thermoplastic adhesion strength; and, FIG. 2 illustrates a graphic representation of calculations on coating thickness showing considerations in coating displacement and contacting surface area.

FIG. 1 illustrates polymer adhesive strengths for a number of different thermoplastics by using both tensile strength and cross-linking bond energies as a determination of adhesion strength. As illustrated in FIG. 1, polyacetals ranked the highest in adhesive strength. Literature and calculated values are compared in Table 1 for polyvinyl acetal, nylon 6, and thermosetting phenol formaldehyde resins.

TABLE 1

|  | Phenol Formaldehyde Resin | Nylon 6 | Polyvinyl Acetal |
|---|---|---|---|
| Tensile Strength (ksi) | 5-9.01 | 4.77-5.83 | 6.3-7.3 |
| Crosslinking Density ($CLU * V_m$) | $2.48 \cdot 10^7$ | $1.01 \cdot 10^7$ | $2.72 \cdot 10^7$ |

Figure 2:
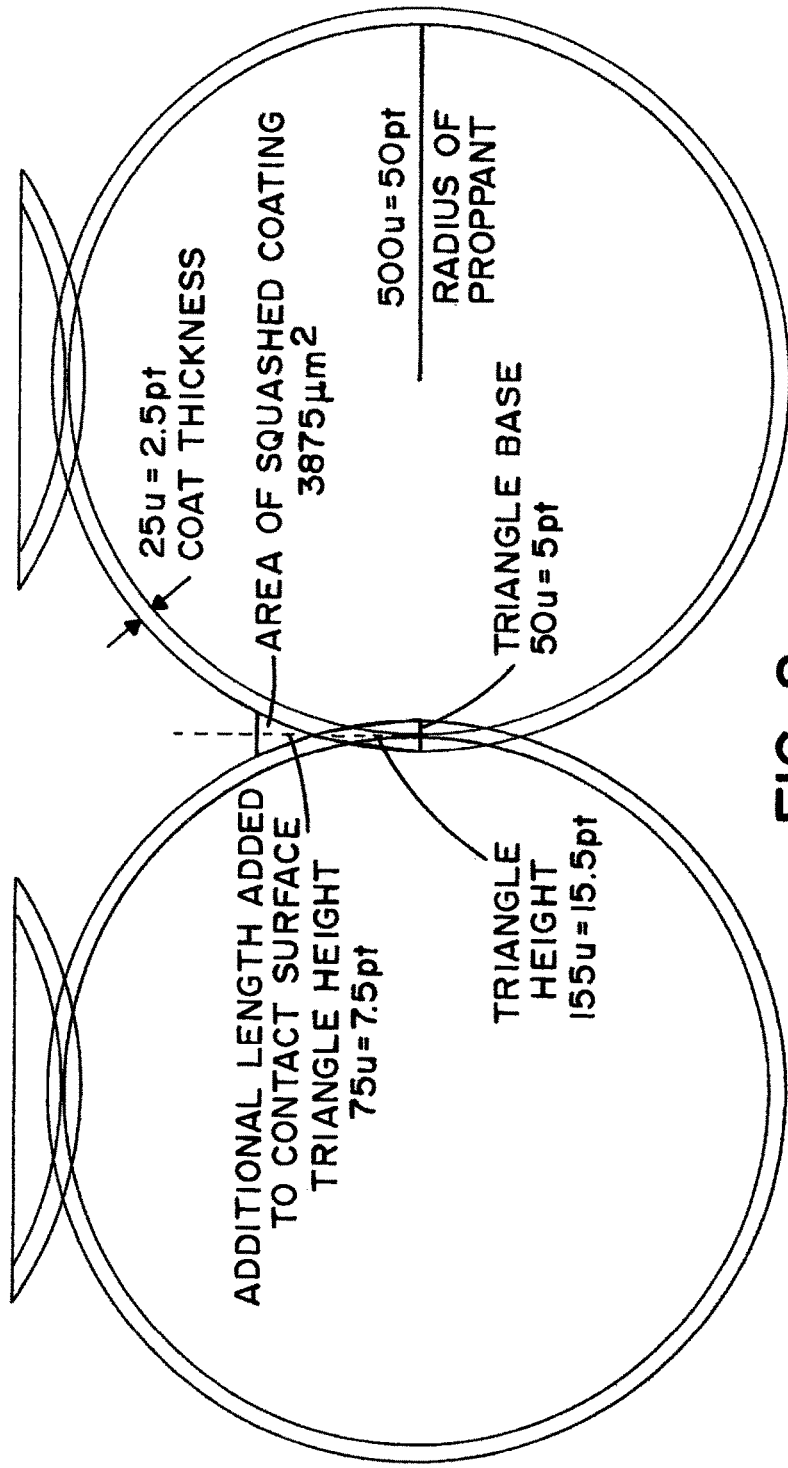

FIG. 2 depicts the calculated squash area as the overlap of coating between two coated particulate material cores coming in contact with one another. As illustrated in FIG. 1, the radius of the particulate core R is about 0.1-1 mm. The polymer coating thickness is about 0.001-0.05 mm. Using a particle core radius of 0.5 mm and a polymer coating thickness of 0.025 mm, the additional contact surface between two particles as illustrated by the triangle is 3875 $\mu m^2$.

The addition of a cross-linker to the polymer coating such as, but not limited to, dialdehyde and/or trialdehydes, allows for control over particle adhesion strength and/or chemical/water resistances. When a cross-linker is used, the cross-linker is generally added in an amount of at least 0.05 wt % of the polymer coating, and typically less than about 10 wt % of the polymer coating mixture. In one non-limiting embodiment, the cross-linker is generally added in an amount of 0.1-2.0 wt % of the polymer coating. The polymer coating thickness generally results in the coated particulate material having at least about a 2% volume increase to the volume of the uncoated particulate material and typically less than a 50% volume increase. In one non-limiting embodiment, the polymer coating thickness generally results in the coated particulate material having 5-20% volume increase to the volume of the uncoated particulate material. In one specific non-limiting example, a 16/20 mesh sized particulate material can have a polymer coating thickness of 25-50 um.

Generally, the polymer coating on the particulate material is highly uniform to obtain improved results in well treatments under low temperature and pressure. A uniform polymer coating can be applied to the particulate material by dissolving the thermoplastic polymer, activator, and modifiers (such as plasticizers and strengthening fillers) in a suitable solvent for spray application on the particulate material. Generally, the coating process includes the step of providing controlled agitation to the particulate material to inhibit or prevent agglomeration and matching of solvent spray versus evaporation rates. Non-limiting devices that can be used to coat the particulate material include a fluidized bed (wurster coating), a v-blender, a double cone blender, a plow mixer, a paddle mixer, and a ribbon mixer.

Additives and/or modifiers can optionally be added to the polymer coating to obtain improved properties over pure cross-linkable thermoplastic polymers. These additives and modifiers can be used to control the mechanical properties and/or cure strength of the polymer coating. In one non-limiting embodiment, at least about 0.5 wt % thermosetting resin can optionally be included in the polymer coating and up to about 50 wt % thermosetting resin can be included in the polymer coating to improve adhesive strengths. In one non-limiting formulation, about 5-30 wt % thermosetting resin can be included in the polymer coating. In another non-limiting embodiment, at least 0.5 wt % plasticizer can optionally be included in the polymer coating and up to about 30 wt % plasticizer can be included in the polymer coating to control deformation under loads to improve interparticle contact area. In one non-limiting formulation, about 3-10 wt % plasticizer can be included in the polymer coating. In another non-limiting embodiment, fillers and diluents can optionally be added to the polymer coating to provide higher tensile and/or tear strength for specific applications, and/or to improve high temperature stability for the low temperature curing system. Non-limiting fillers and diluents that can be used include nanoparticle fillers, and/or silane-coupled oxide nanoparticles and nanoplatelets.

The curing temperature and/or Tg of the polymer coating can be controlled through the use of modifier additions, and/or by controlling the percentage of specific active side-groups and the molecular weight of the curable thermoplastic resin systems used in the preparation of the curable thermoplastic-coated particulate materials.

EXAMPLES

The following three non-limiting examples illustrate application procedures along with adhesion strengths of annealed polymer coated particulate material that would be experienced in a field test or a real fracturing operation.

Example 1

A coating solution sample of 25 g polyvinyl buytral (PVB) was dissolved into 500 mL ethanol (5% w/v), with the addition of 0.1% dialdehyde (glyoxal). The solution was spray coated onto 750 g of 16/20 mesh size ceramic particulate material (Carboceramic) using a wurster fluidized bed spray coater (Glatt). The resulting uniform polymer coating was 33 µm in thickness. Sample polymer-coated particulates were capable of being stored for over one year at 38° C. without agglomeration. A slurry of polymer-coated particulate material (30 g) in 1.5 mM HCl (100 mL) was placed into a stainless steel chamber and sealed before heating to 100° C. for 72 hours to replicate well conditions. Consolidated coated particulate material gave an unconstrained adhesion strength of 104 psig resistance.

Example 2

A coating solution sample of 30 g polyvinyl buytral (PVB) was dissolved into 500 mL ethanol (6% w/v), with the addition of 0.1% dialdehyde (glyoxal). The solution was spray coated onto 750 g of 16/20 mesh size ceramic particulate material (Carboceramic) using a wurster fluidized bed spray coater (Glatt). The resulting uniform polymer coating was 39 µm in thickness. Sample polymer-coated particulates were capable of being stored for over one year at 38° C. without agglomeration. A slurry of polymer-coated particulate material (30 g) in 1.5 mM HCl (100 mL) was placed into a stainless steel chamber and sealed before heating to 100° C. for 72 hours to replicate well conditions. Consolidated coated particulate material gave an unconstrained adhesion strength of 149 psig resistance.

Example 3

A coating solution sample of 120 lbs polyvinyl buytral (PVB) was dissolved into 180 gallons ethanol (10% w/v), with the addition of 0.1% dialdehyde (glyoxal). The solution was spray coated onto 3,000 lbs of 16/20 mesh size ceramic proppant using a wurster fluidized bed spray coater. The resulting uniform coating was about 49 µm in thickness. Sample particulates were capable of being stored for over a year at 38° C. without agglomeration. A slurry of coated proppant (30 g) in 1.5 mM HCl (100 mL) was placed into a stainless steel chamber and sealed before heating to 100° C. for 72 hours to replicate well conditions. Consolidated particles gave unconstrained adhesion strength of 204 psig resistance.

The present invention is well adaptable to meet numerous subterranean formation consolidation needs and to attain the end advantages mentioned as well as those that are inherent therein. It is capable for numerous changes to be made by those skilled in the art, and such changes are encompassed within the spirit and scope of this invention as defined by the appended claims.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. A method of treating a subterranean formation with a polymer-coated particulate material comprising:
   a. providing a fluid suspension of free-flowing polymer-coated particulate material, said polymer-coated particulate material comprising a particulate material that is coated with a thermoplastic polymer coating that includes cross-linkable functional groups, said particulate material having a particle size of about 0.01-10 mm, said particulate material including a material selected from the group consisting of sand, sintered bauxite, silica alumina, glass bead, bauxite, fumed silica, ceramic material, glass material, polymer material, polytetrafluoroethylene material, and gravel, said thermoplastic polymer coating is coated on an outer surface of said particulate material, said thermoplastic polymer includes polyvinyl butyral, said thermoplastic polymer coating includes at least 50 wt. % polyvinyl butyral, said thermoplastic polymer constitutes at least about 90 wt. % of the thermoplastic polymer coating, said thermoplastic polymer coating increasing a radius of said polymer-coated particulate material as compared to a radius of said particulate material by about 5-20%, said thermoplastic polymer coating includes 0.05-10 wt. % of one or more cross-linker compounds, said cross-linker compounds including dialdehyde, said polymer-coated particulate material storable for over one year at 38° C. without agglomeration;

b. inserting said fluid suspension into said subterranean formation at a temperature that is less than a curing temperature of said thermoplastic polymer coating; and, c. delivering said polymer-coated particulate material into the subterranean formation at a location wherein a temperature in the subterranean formation is greater than said curing temperature of said thermoplastic polymer coating to thereby cause agglomeration of said polymer-coated particulate materials while in the subterranean formation by said thermoplastic polymer coating on a multiple of said polymer-coated particulate materials bonding together to form an in situ immobile framework of said plurality of said polymer-coated particulate materials in the subterranean formation, said polymer-coated particulate materials agglomerate at a pressure of 1000-12000 psig and a temperature as low as 100° C., an adhesion strength between said polymer-coated particulate materials that have agglomerated together is at least 104 psig, said immobile framework configured to i) reduce solid particle flow-back from said subterranean formation, ii) reduce formation of fines from the subterranean formation and said immobile framework, or iii) combinations thereof, said polymer-coated particulate materials that have agglomerated together having an unconstrained adhesion strength of at least 104 psig resistance.

2. The method as defined in claim 1, wherein said particulate material is a ceramic material, said ceramic material including carboceramic, said particulate material having a particle size of about 0.25-2 mm.

3. The method as defined in claim 1, wherein said thermoplastic polymer coating includes at least 95 wt. % polyvinyl butyral and 0.05-1 wt. % dialdehyde, and said particulate material is a ceramic material having a particle size of about 0.25-2 mm, said thermoplastic polymer coating does not tackify at a temperature below 30° C.

4. The method as defined in claim 1, wherein said dialdehyde includes glyoxal.

5. The method as defined in claim 2, wherein said thermoplastic polymer coating includes at least 95 wt. % polyvinyl butyral and 0.05-1 wt. % dialdehyde, said particulate material has a particle size of about 0.25-2 mm, said thermoplastic polymer coating does not tackify at a temperature below 30° C.

6. The method as defined in claim 5, wherein said dialdehyde includes glyoxal.

* * * * *